United States Patent
Yamamoto

(10) Patent No.: US 11,735,029 B2
(45) Date of Patent: Aug. 22, 2023

(54) EMERGENCY COMMUNICATION SYSTEM

(71) Applicant: OTTA INC., Fukuoka (JP)

(72) Inventor: Fumikazu Yamamoto, Fukuoka (JP)

(73) Assignee: OTTA INC., Fukuoka (JP)

( * ) Notice: Subject to any disclaimer, the term of this patent is extended or adjusted under 35 U.S.C. 154(b) by 0 days.

(21) Appl. No.: 17/791,145

(22) PCT Filed: Oct. 22, 2020

(86) PCT No.: PCT/JP2020/039727
§ 371 (c)(1),
(2) Date: Jul. 6, 2022

(87) PCT Pub. No.: WO2021/140722
PCT Pub. Date: Jul. 15, 2021

(65) Prior Publication Data
US 2023/0025247 A1 Jan. 26, 2023

(30) Foreign Application Priority Data
Jan. 8, 2020 (JP) .................. 2020-001582

(51) Int. Cl.
*G08B 25/01* (2006.01)
*H04W 4/90* (2018.01)
*G08B 25/10* (2006.01)

(52) U.S. Cl.
CPC ........... *G08B 25/016* (2013.01); *G08B 25/10* (2013.01); *H04W 4/90* (2018.02)

(58) Field of Classification Search
CPC .... G08B 25/016; G08B 25/10; G08B 25/009; H04W 4/90; H04M 11/04
(Continued)

(56) References Cited

U.S. PATENT DOCUMENTS 10,019,769 B1* 7/2018 Hodge .................. H04L 67/306
2006/0293022 A1* 12/2006 Jindal .................... H04M 11/04
455/404.1
(Continued)

FOREIGN PATENT DOCUMENTS

EP 3142090 A1 3/2017
JP 2007-151104 A 6/2007
(Continued)

*Primary Examiner* — Charles N Appiah
*Assistant Examiner* — Frank E Donado
(74) *Attorney, Agent, or Firm* — Young Basile Hanlon & MacFarlane, P.C.

(57) ABSTRACT

An emergency communication system, while accurately and reliably detecting a location of an object person, receives contact from the object person and grasps a state of the object person when a matter of emergency has occurred. An object person terminal transmits identification information via short-range wireless communication, acquires location information by a GPS function, and transmits the identification information and the location information to a server. A detection terminal transmits the identification information transmitted from the object person terminal. The server specifies the location of the object person terminal on the basis of the information transmitted from the detection terminal or the identification information and the location information transmitted from the object person terminal. The object person terminal, when the occurrence of a matter of emergency is sensed, records ambient sounds as object person sound information, and transmits the recorded object person sound information to the server.

14 Claims, 7 Drawing Sheets

(58) Field of Classification Search
USPC .......................................................... 455/404
See application file for complete search history.

(56) References Cited

U.S. PATENT DOCUMENTS

| | | | | |
|---|---|---|---|---|
| 2014/0370879 A1* | 12/2014 | Redding | ........... | H04M 3/42178 |
| | | | | 455/419 |
| 2015/0289121 A1* | 10/2015 | Lesage | .................... | H04W 4/90 |
| | | | | 455/404.1 |
| 2015/0312696 A1* | 10/2015 | Ribbich | ................ | H04W 4/029 |
| | | | | 455/418 |
| 2019/0281414 A1* | 9/2019 | Schlesinger | .......... | H04W 4/023 |
| 2019/0361131 A1 | 11/2019 | Sakabe | | |
| 2020/0234380 A1* | 7/2020 | Dulori | .................... | G06Q 40/08 |
| 2020/0251092 A1* | 8/2020 | Ivey | ........................ | H04W 4/90 |

FOREIGN PATENT DOCUMENTS

| | | |
|---|---|---|
| JP | 3167778 U | 5/2011 |
| JP | 5891468 B1 | 3/2016 |
| JP | 2019-204300 A | 11/2019 |

\* cited by examiner

EMERGENCY COMMUNICATION SYSTEM

CROSS-REFERENCE TO RELATED APPLICATION(S)

This application claims priority to Japanese Application Patent Serial No. JP 2020-001582 filed Jan. 8, 2020, the entire disclosure of which is hereby incorporated by reference.

TECHNICAL FIELD

The present invention relates to an emergency communication system that enables, while grasping presence of an object person to be watched such as a child or the like, grasping a state of the object person in an emergency.

BACKGROUND

For example, a guardian having a small child often has concerns about whether the child has arrived safely to school or a cram school without having an accident or the like, and will come home safely at the time of coming home. For this reason, conventionally, various efforts have been made to ensure the safety of children, such as observing school routes, in cooperation with local residents or the like, for example. However, due to a change in the social environment such as an increase in the number of double-income households and an aging population, or the like, it is difficult to provide sufficient watching. Under such circumstances, cases in which a child is taken away on the way to or from school or involved in an incident continue, and rather increase.

As a mechanism for taking measures against the above problem, for example, a service is provided that enables ascertaining of location information of a child using a GPS function mounted on a portable information terminal such as a smartphone or the like.

However, in a portable information terminal such as a smartphone or the like, a terminal price, a communication fee, and the like are generally high, and it is considered that restriction of use due to educational reasons and the like is also necessary, and thus it is not realistic to cause each child to have a portable information terminal for the purpose of ascertaining location information.

In addition, location detection by the GPS function has the problem that accuracy of a detected location is not sufficiently high. For example, the problem occurs that although a child is actually at school, the child is detected as being on a road outside the school, or the like, and a guardian or the like who has ascertained the location of the child becomes anxious or feels uncomfortable.

Furthermore, since the GPS function consumes a large amount of power, it is necessary to charge the smartphone or the like at least every several days when the GPS function is constantly used to detect a location. In this case, for example, if a user forgets charging, the user fails to ascertain the location of the child in an emergency.

In order to take measures against such a problem, a technique has also been developed that uses power-saving short-range wireless communication such as Bluetooth or the like without using the GPS function. For example, a child is caused to carry a simple Bluetooth terminal that transmits only identification information, and the identification information transmitted from the Bluetooth terminal is read by a reading terminal located in a watching area such as a school route or the like. As a result, it is possible to ascertain that the child has passed the location of the reading terminal (see, for example, JP 5891468 A).

By such a method, since short-range wireless communication is used, accuracy of location detection is high, and since the GPS function is not used, it is not necessary to frequently charge a terminal carried by a child.

SUMMARY

However, with respect to a location detection technology as described above, when a matter of emergency occurs, for example, in a case where a child goes missing, even if the location of the child can be detected, there is the problem that communicating with the child or grasping the state of the child or the surrounding state fails to be performed. For this reason, there is also the problem that clues for searching for the child are few, which makes it difficult to find the child.

The present invention is made in view of the above circumstances. That is, an object of the present invention is to provide an emergency communication system for enabling, while accurately and reliably detecting a location of an object person, receiving contact from the object person and grasping a state of the object person when a matter of emergency has occurred.

The above object is achieved by the following means.

An emergency communication system includes: an object person terminal carried by an object person; a detection terminal that is present in a region including a watching area of the object person set in advance, and detects the object person terminal with which communicable is possible via short-range wireless communication; a server that registers information transmitted from the object person terminal and the detection terminal, and a sensing unit that senses occurrence of a matter of emergency. The object person terminal includes a first communication unit, a second communication unit, and a recording unit. The first communication unit transmits identification information for identifying the object person terminal via the short-range wireless communication. The second communication unit acquires location information of the object person terminal on the basis of a signal from a GPS satellite, and transmits the identification information and the location information to the server via long-range wireless communication the communication distance of which is longer than a communication distance of short-range wireless communication. The recording unit records ambient sounds as object person sound information. The detection terminal includes a detection unit and a transmission unit. The detection unit detects the object person terminal with which communication is possible. The transmission unit, when the object person terminal is detected by the detection unit, acquires the identification information transmitted from the first communication unit and transmits the identification information to the server. The server includes an acquisition unit and a specification unit. The acquisition unit acquires the identification information transmitted from the detection terminal and information on the location of the detection terminal. The specification unit specifies a location of the object person terminal on the basis of the identification information and the information on the location of the detection terminal acquired by the acquisition unit, or the identification information and the location information transmitted from the second communication unit of the object person terminal. The second communication unit of the object person terminal transmits, when occurrence of a matter of emergency is sensed by the sensing unit, the object person sound information recorded by the recording unit to the server.

The emergency communication system according to the present invention includes the object person terminal, the detection terminal, the server, and the sensing unit that senses occurrence of a matter of emergency. The object person terminal transmits identification information for identifying the object person terminal via the short-range wireless communication, acquires location information of the object person terminal on the basis of a signal from the GPS satellite, and transmits the identification information and the location information to the server via the long-range wireless communication the communication distance of which is longer than the communication distance of the short-range wireless communication. The detection terminal detects the object person terminal with which communication is possible, and acquires the identification information transmitted from the object person terminal when the object person terminal is detected, and transmits the identification information to the server. The server acquires the identification information transmitted from the detection terminal and information on a location of the detection terminal, and specifies a location of the object person terminal on the basis of the acquired identification information and the acquired information on the location of the detection terminal, or the identification information and the location information transmitted from the object person terminal. The object person terminal, when occurrence of a matter of emergency is sensed by the sensing unit, records ambient sounds as object person sound information, and transmits the recorded object person sound information to the server. As a result, while accurately and reliably detecting the location of the object person such as a child or an elderly person, it is possible to receive contact from the object person and appropriately grasp the state of the object person when a matter of emergency occurs.

DETAILED DESCRIPTION

Figure 1:
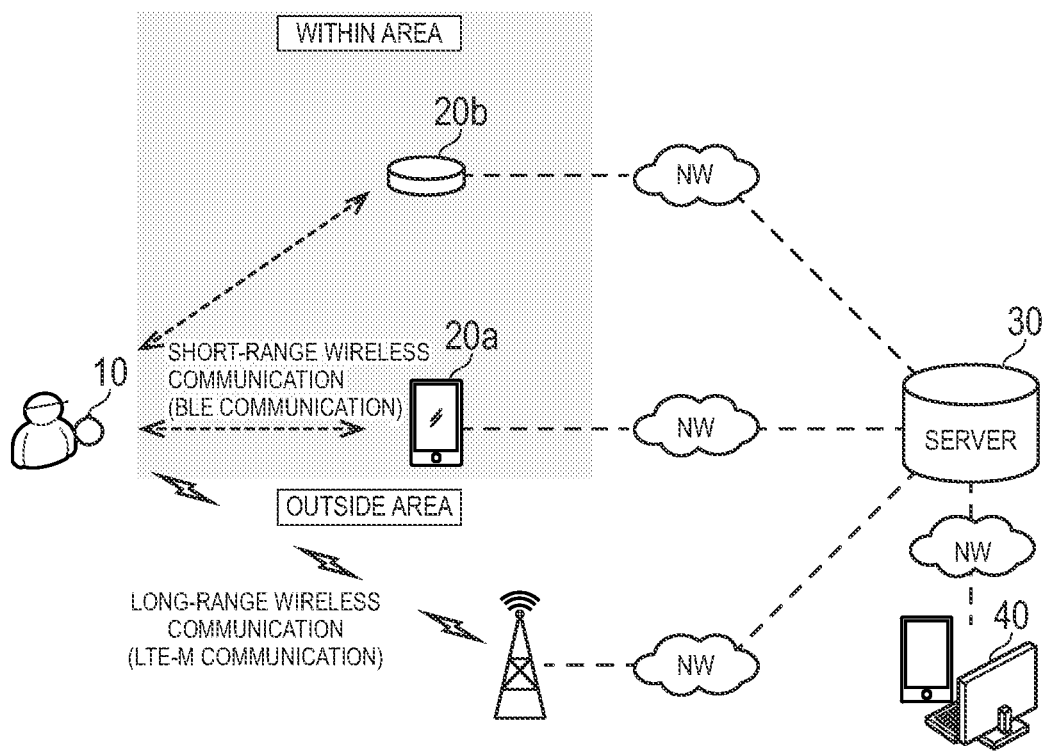
FIG. 1 is a diagram illustrating a schematic configuration of an emergency communication system according to an embodiment of the present invention.

Hereinafter, an embodiment of the present invention will be described with reference to the accompanying drawings. In the description of the drawings, the same elements are denoted by the same reference numerals, and redundant description will be omitted. In addition, dimensional ratios in the drawings are exaggerated for convenience of description, and may be different from actual ratios.

<Configuration of Emergency Communication System>

FIG. 1 is a diagram illustrating a schematic configuration of an emergency communication system according to an embodiment of the present invention.

As illustrated in FIG. 1, the emergency communication system includes an object person terminal 10, a detection terminal 20 (20a, 20b), a server 30, and a guardian terminal 40. Hereinafter, the detection terminal 20a and the detection terminal 20b are, when not particularly distinguished, collectively referred to as the detection terminal 20.

The object person terminal 10 communicates with the detection terminal 20 (20a, 20b) via short-range wireless communication, and is connected to the server 30 through a network via long-range wireless communication.

The detection terminal 20 (20a, 20b) communicates with the object person terminal 10 via the short-range wireless communication, and is connected to the server 30 through the network via wired or wireless communication.

The server 30 is configured to be able to communicate with the object person terminal 10, the detection terminal 20 (20a, 20b), and the guardian terminal 40, through the network.

The guardian terminal 40 is connected to the server 30 through the network via the wired or wireless communication. Hereinafter, each configuration will be described in detail.

<Object Person Terminal 10>

The object person terminal 10 is a terminal carried by an object person to be watched (hereinafter, also simply referred to as an "object person") such as a child, an elderly person, or the like.

Figure 2:
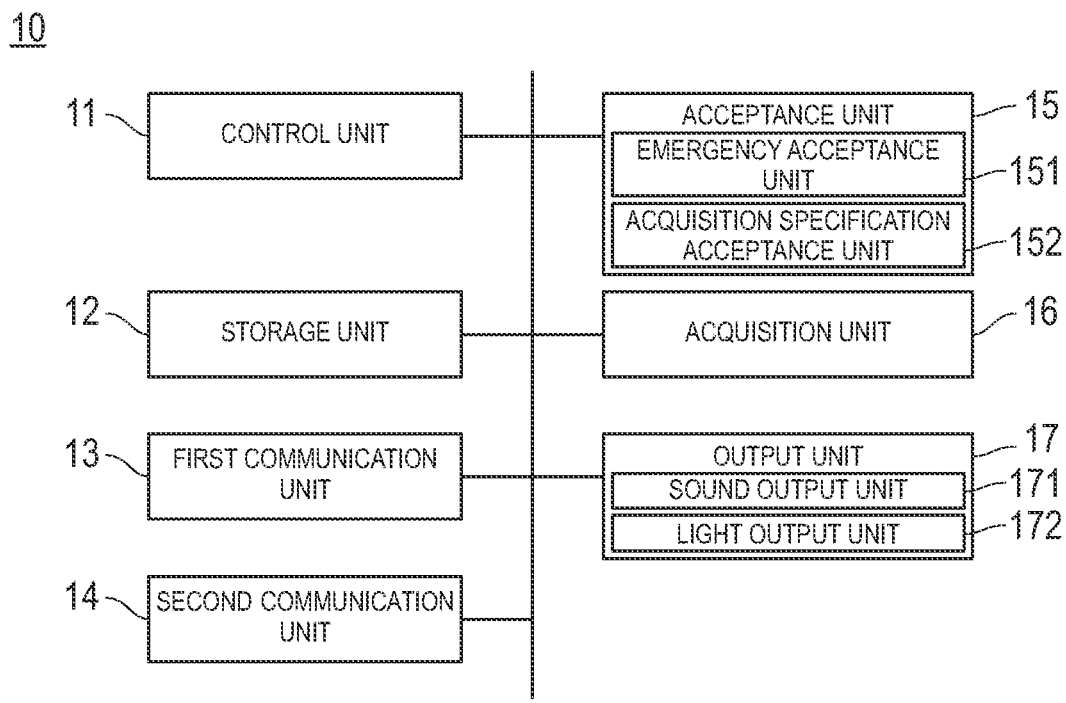
FIG. 2 is a block diagram illustrating a schematic configuration of an object person terminal.

FIG. 2 is a block diagram illustrating a schematic configuration of the object person terminal.

As illustrated in FIG. 2, the object person terminal 10 includes a control unit 11, a storage unit 12, a first communication unit 13, a second communication unit 14, an acceptance unit 15, and an acquisition unit 16. The components are connected one another through a bus in a mutually communicable manner.

The control unit 11 includes a CPU (Central Processing Unit), and executes, according to a program, control of each component described above and various types of arithmetic processing. In the present embodiment, the control unit 11 functions as a sensing unit and an object person notifying unit.

The storage unit 12 includes a ROM (Read Only Memory) that stores various programs and various types of data in advance and a RAM (Random Access Memory) that temporarily stores programs and data as a work region, and stores various programs and various types of data.

In addition, the storage unit 12 stores identification information for identifying the object person terminal 10, information indicating a first time interval that is a time interval at which the first communication unit 13 sends the identification information and a second time interval that is a time interval at which the second communication unit 14 performs communication, and the like. Furthermore, the storage unit 12 stores various types of information acquired by the acquisition unit 16.

The first communication unit 13 outputs a signal for performing short-range wireless communication using, for example, the Bluetooth (registered trademark) standard, and communicates with another terminal, device, or the like existing in proximity via the short-range wireless communication. As a standard of short-range wireless communication, for example, Bluetooth 4.0 (also referred to as Bluetooth Low Energy or BLE) is used. This standard is suitably used in the present embodiment because it achieves significant power saving instead of not pursuing a communication speed. The first communication unit 13 performs the short-range wireless communication at a first time interval that is a relatively short time interval of about several tens of milliseconds to several seconds, for example, and sends the identification information for identifying the object person terminal 10 to the surroundings. The first time interval can be set to, for example, about 3 seconds.

The second communication unit 14 communicates with other terminals, devices, and the like via long-range wireless communication provided by a mobile communication carrier or the like. As a standard of long-range wireless communication, for example, LTE-M (Long Term Evolution for Machine-type-communication) is used. This standard is one of LPWA (Low Power Wide Area: wireless communication techniques that enable power saving and wide-area communication) utilizing existing LTE equipment, and is suitably used in the present embodiment because power saving and improvement of communication stability are achieved while a moderate communication speed is secured. In the present embodiment, the second communication unit 14 transmits the identification information for identifying the object person terminal 10 to the server 30 at a second time interval that is a relatively long time interval of, for example, several minutes to several hours. The second time interval can be optionally set by the user, and for example, may be selected and set by the user from among selection candidates such as 5 minutes, 10 minutes, 30 minutes, 1 hour, 2 hours, 12 hours, and the like. In addition, the second time interval may be set such that different values are used in a case where the object person terminal 10 is moving and a case where the object person terminal 10 is stationary. For example, the second time interval during movement when the object person terminal 10 is moving may be set to 30 minutes, and the second time interval during stationary when the object person terminal 10 is stationary may be set to 1 hour. Here, whether the object person terminal 10 is moving or stationary can be determined, for example, on the basis of detection information of an acceleration sensor (not illustrated) provided in the object person terminal 10. Furthermore, the second time interval may be set to a different value corresponding to the stage of the moving speed of the object person terminal 10. For example, different values may be set to be used correspondingly to the stages of the moving speed, such as when the moving speed of the object person terminal 10 is low (0 km/h to 4 km/h), medium (4 km/h to 10 km/h), high (10 km/h or higher), and the like. The stages of the moving speed are not limited to the above example, and various numbers and ranges of stages can be set.

In addition, the second communication unit 14 has a GPS function of receiving a signal from a GPS satellite and acquiring location information on the basis of the received signal. The second communication unit 14, when transmitting the identification information for identifying the object person terminal 10 to the server 30 as described above, activates the GPS function to acquire the location information, and transmits the acquired location information to the server 30 together with the identification information. As described above, in addition to using the long-range wireless communication technology by which power saving is achieved, the second communication unit 14 performs the long-range wireless communication and the location information acquisition by the GPS function at relatively long time intervals of about 1 hour and thus, further power saving is provided.

The configuration of the acceptance unit 15 is a configuration to accept an instruction from an object person or the like, and includes, for example, a push button, a button on a touch panel, and the like. In the present embodiment, the acceptance unit 15 includes an emergency acceptance unit 151 for accepting an instruction regarding the occurrence of a matter of emergency, and an acquisition instruction acceptance unit 152 for accepting an instruction for acquiring sound information for distribution from the server 30. When the emergency acceptance unit 151 accepts an instruction regarding the occurrence of a matter of emergency, the control unit 11 senses the occurrence of a matter of emergency as the sensing unit. Note that the control unit 11 may sense the occurrence of a matter of emergency when an abnormal motion such as falling or a sudden speed change of the object person, or the like is detected on the basis of outputs of various sensors (not illustrated) such as the acceleration sensor or the like provided in the object person terminal 10 for detecting a motion of the object person terminal 10. In addition, the control unit 11 may sense the occurrence of a matter of emergency when having acquired an emergency flag to be described later from the server 30. Note that the acceptance unit 15 may accept an instruction via a sound acquired by a microphone or the like, or may accept an instruction via an image (including video) acquired by a camera or the like. Furthermore, the emergency acceptance unit 151 and the acquisition instruction acceptance unit 152 of the acceptance unit 15 may be mounted in association with respective buttons, or may be mounted in association with respective operation methods such as short pressing, long pressing, and continuous pressing, or the like of one button. Furthermore, a timing at which the emergency acceptance unit 151 is used is not limited to a timing at which a matter of emergency occurs, and may be used at any timing desired by the object person.

The configuration of the acquisition unit 16 is a configuration for acquiring ambient sounds and images (video) around the object person terminal 10, and includes a microphone, a camera, and the like. The acquisition unit 16 functions as a recording unit in the present embodiment. The acquisition unit 16 acquires ambient sounds or images (video) when the emergency acceptance unit 151 accepts an instruction regarding the occurrence of a matter of emergency, for example. For example, the acquisition unit 16 may repeatedly record ambient sounds or images (video) at a predetermined interval after the occurrence of a matter of emergency is sensed. As a result, it is possible to effectively grasp the state of the object person and the surrounding state while suppressing the power consumption. The control unit 11 stores information indicating sounds or images (video) acquired by the acquisition unit 16 in the storage unit 12 and transmits the information to the server 30 via the second communication unit 14. Furthermore, the control unit 11 controls the second communication unit 14 to acquire the location information by the GPS function, and transmits a notification indicating the occurrence of a matter of emergency to the server 30 together with the identification information and the location information of the object person terminal 10.

The output unit 17 includes a sound output unit 171 that outputs sound and a light output unit 172 that outputs light. The sound output unit 171 is a sound output interface such as a speaker, an earphone jack, or the like and the light output unit 172 is a light source such as an LED or the like. The sound output unit 171 or the light output unit 172 notifies the object person by sound or light that the distribution sound information is received in the server 30. In this case, the output unit 17 also functions as the object person notifying unit. As a result, when a notification by sound or light by the output unit 17 is ascertained, the user can reliably and easily acquire the distribution sound information stored in the server 30 and listen to the sound simply by operating the acquisition instruction acceptance unit 152. Note that the light output unit 172 may be provided on the acquisition instruction acceptance unit 152. As a result, when the light output unit 172 on the acquisition instruction acceptance unit 152 is emitting light, the user may operate the acquisition instruction acceptance unit 152, and can more reliably and easily acquire the distribution sound information stored in the server 30 and listen to the sound. Furthermore, the output unit 17, as an image output unit, may include a video output interface such as a display, a video output terminal, or the like, and execute various notifications by an image (video).

Since the object person terminal 10 in the present embodiment achieves power saving as described above with respect to wireless communication, the power consumption of which is normally high, when using a small secondary battery such as a rechargeable lithium ion battery, or the like, for example, the object person terminal 10 can operate without being charged for about one month, and can operate, depending on the setting content and the use situation, for about several months to one year without being charged.

<Detection Terminal 20 (20a, 20b)>

The detection terminal 20 is a terminal that is present in a region including the watching area of the object person and detects the object person terminal 10 with which communication is possible via the short-range wireless communication. The detection terminal 20a is a fixed terminal installed at a predetermined location included in the watching area, and the detection terminal 20b is a mobile terminal provided on a person, a vehicle, or the like that is a mobile body moving in a region including the watching area. Examples of the above vehicle include various vehicles such as a private car, a taxi, a bus, and a train, and the like. For example, the detection terminal 20 may be configured by installing a dedicated application in a general-purpose information terminal such as a smartphone, a tablet PC, or the like or may be configured as a dedicated terminal having a minimum configuration as described below.

Figure 3:
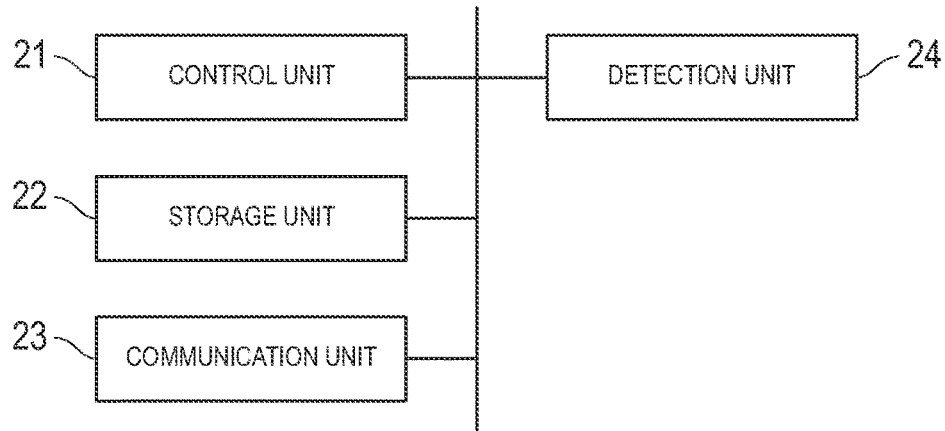
FIG. 3 is a block diagram illustrating a schematic configuration of a detection terminal.

FIG. 3 is a block diagram illustrating a schematic configuration of the detection terminal.

As illustrated in FIG. 3, the detection terminal 20 includes a control unit 21, a storage unit 22, a communication unit 23, and a detection unit 24. The components are connected one another through a bus in a mutually communicable manner. Since the configurations of the control unit 21 and the storage unit 22 of the detection terminal 20 are the same as those of the control unit 11 and the storage unit 12 of the object person terminal 10, respectively, the description of the configurations will be omitted.

The configuration of the communication unit 23 is a configuration for communicating with other terminals, devices, and the like via a network. The communication unit 23 transmits and receives various types of information to and from the server 30, for example.

The configuration of the detection unit 24 is a configuration to detect the object person terminal 10 with which communication is possible via the above-described short-range wireless communication such as Bluetooth, or the like. As described above, the object person terminal 10 performs communication via the short-range wireless communication by the first communication unit 13. For example, when receiving the identification information sent by the first communication unit 13 of the object person terminal 10, the detection unit 24 can detect the object person terminal 10 as an object person terminal 10 with which communication is possible.

When the detection unit 24 detects the object person terminal 10, the control unit 21, as a transmission unit, transmits the identification information of the object person terminal 10 to the server 30.

Since the detection terminal 20a is a fixed terminal, the information on the location of each detection terminal 20a is stored in advance in the storage unit 32 of the server 30 in association with the information for identifying the detection terminal 20a. When the identification information of the object person terminal 10 detected by the detection unit 24 is transmitted to the server 30, the detection terminal 20a transmits together information for identifying the detection terminal 20a to the server 30. As a result, the server 30 can use the information for identifying the detection terminal 20a received together when receiving the identification information of the object person terminal 10 from the detection terminal 20a, to acquire the information on the location of the detection terminal 20a from the storage unit 32.

On the other hand, since the detection terminal 20b is a mobile terminal, the information on the location of each detection terminal 20b is acquired by the GPS function included in the corresponding detection terminal 20b on the basis of a signal from the GPS satellite. When the identification information of the object person terminal 10 detected by the detection unit 24 is transmitted to the server 30, the detection terminal 20b transmits together information indicating the location of the detection terminal 20b. As a result, the server 30 can acquire the information indicating the location of the detection terminal 20b on the basis of the information received together when receiving the identification information of the object person terminal 10 from the detection terminal 20b.

For example, when the detection terminal 20b, which is a mobile terminal, is configured by a smartphone, a tablet PC, or the like, the detection terminal has a configuration of a general information terminal further including an operation unit or a display unit (such as a touch panel display or the like). In this case, the detection terminal 20 can also be used as the guardian terminal 40 to be described later.

<Server 30>

The server 30 is an information processing device, for example, operated by a provider of a service that specifies and notifies location information.

Figure 4:
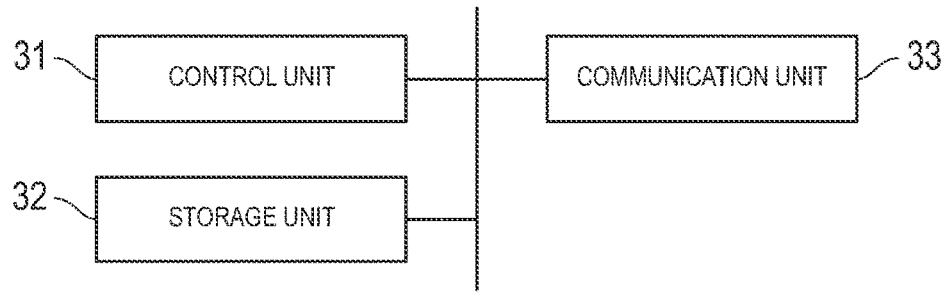
FIG. 4 is a block diagram illustrating a schematic configuration of a server.

FIG. 4 is a block diagram illustrating a schematic configuration of the server.

As illustrated in FIG. 4, the server 30 includes a control unit 31, a storage unit 32, and a communication unit 33. The components are connected one another through a bus in a mutually communicable manner. Since the configurations of the control unit 31, the storage unit 32, and the communication unit 33 of the server 30 are the same as those of the control unit 21, the storage unit 22, and the communication unit 23 of the detection terminal 20, respectively, the description of the configurations will be omitted.

The control unit 31 functions as an acquisition unit and a specification unit by reading a program and executing processing. The control unit 31, as an acquisition unit, acquires the identification information transmitted from the detection terminal 20 and the information on the location of the detection terminal 20. Furthermore, the control unit 31, as a specification unit, specifies the location of the object person terminal 10 on the basis of the identification information and the information on the location of the detection terminal 20 acquired by the acquisition unit. Alternatively, the control unit 31, as the specification unit, may specify the location of the object person terminal 10 on the basis of the identification information and the location information transmitted from the second communication unit of the object person terminal 10.

Furthermore, the control unit 31 may function as a guardian notification unit, a setting unit, a receiving unit, a sound flag setting unit, and a visualization unit. The control unit 31, as the guardian notification unit, notifies the guardian of the object person of the object person sound information transmitted from the object person terminal 10. In addition, the control unit 31, as the setting unit, sets an emergency flag indicating the occurrence of a matter of emergency regarding the object person who holds the object person terminal 10.

For example, the control unit 31, when the location of a specified object person terminal 10 is included in a predetermined range within the watching area, sets the emergency flag for the object person terminal 10. Moreover, the control unit 31, when the location of the specified object person terminal 10 is outside the watching area, sets the emergency flag for the object person terminal 10. Furthermore, the control unit 31, when the identification information transmitted from the first communication unit 13 of the object person terminal 10 is not acquired for a predetermined time, sets the emergency flag for the object person terminal 10.

Furthermore, the control unit 31, as a receiving unit, receives distribution sound information to be distributed to an object person terminal 100. Furthermore, the control unit 31, as the sound flag setting unit, when the distribution sound information is received in the receiving unit, sets the sound distribution flag. Furthermore, the control unit 31 outputs information on the location of the object person terminal 10 specified by the specification unit. The control unit 31 may output the information on the location as coordinate information such as two-dimensional, three-dimensional, or other coordinate information, or may convert the coordinate information into an address, an area name, or the like according to a predetermined rule and output the converted information as the address or the area name. In addition, the control unit 31 outputs, in association with the information on the location of the object person terminal 10, the display corresponding to the object person sound information recorded at the location, to be visualized.

The storage unit 32 stores, as information on the object person and the object person terminal 10, the identification information of the object person terminal 10, attribute information such as a name, an age, and the like of the object person who holds the object person terminal 10, attribute information such as a name, a contact address, and the like of a guardian of the object person, and the like, in association with one another.

In addition, the storage unit 32 stores, as the information on the detection terminal 20, the identification information of the detection terminal 20, attribute information indicating whether the detection terminal 20 is a fixed terminal or a mobile terminal, information on the location of the detection terminal 20 in a case of being a fixed terminal, and the like, in association with one another.

The storage unit 32 also stores a time setting flag for setting the second time interval of the object person terminal 10, flag information on the emergency flag, the sound distribution flag, and the like, information on a range of the watching area for setting various flags, and the like. The range of the watching area may be defined by a range of coordinate information such as two-dimensional, three-dimensional, or other coordinate information, or may be defined by an address, an area name, or the like corresponding to the range of the coordinate information. In addition, the storage unit 32 also stores information on a predetermined range within the watching area where the object person terminal 10 is assumed to easily go outside the watching area, information on environments of regions within the watching area, information on a degree of danger according to the environment, information on a degree of danger according to a time zone of each region, and the like. In addition, the storage unit 32 also stores a value of the second time interval set for each object person terminal 10 according to a state of specifying the location, a moving state, and a moving speed of the object person terminal 10, and an environment, a time zone, and the like of a section where the object person terminal 10 is present.

<Guardian Terminal 40>

The guardian terminal 40 is a terminal used by a guardian who protects and supervises the object person. The guardian terminal 40 receives a notification from the server 30 to notify the guardian of it, or accesses the server 30 to acquire and display the object person sound information and the information on the location of the object person stored in the server 30.

Figure 5:
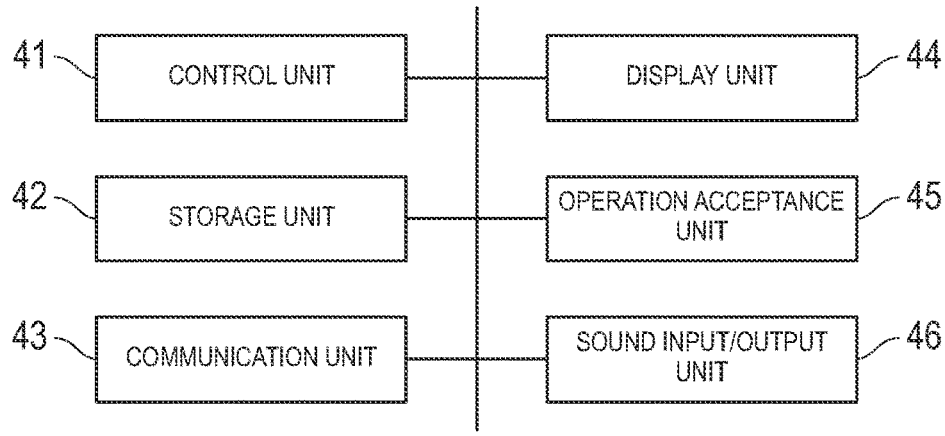
FIG. 5 is a block diagram illustrating a schematic configuration of a guardian terminal.

FIG. 5 is a block diagram illustrating a schematic configuration of the guardian terminal.

As illustrated in FIG. 5, the guardian terminal 40 includes a control unit 41, a storage unit 42, a communication unit 43, a display unit 44, an operation acceptance unit 45, and a sound input/output unit 46. The components are connected one another through a bus in a mutually communicable manner. Since the configurations of the control unit 41, the storage unit 42, and the communication unit 43 of the guardian terminal 40 are the same as those of the control unit 21, the storage unit 22, and the communication unit 23 of the detection terminal 20, respectively, the description of the configurations will be omitted.

The display unit 44 includes an LCD (liquid crystal display), an organic EL display, and the like, and displays various types of information.

The operation acceptance unit 45 includes a touch sensor, a pointing device such as a mouse or the like, a keyboard, and the like, and accepts various operations of the user. The display unit 44 and the operation acceptance unit 45 may constitute a touch panel by superimposing a touch sensor as the operation acceptance unit 45 on a display surface as the display unit 44. The operation acceptance unit 45 accepts from a guardian, for example, an instruction for acquiring and outputting object person sound information from the server 30.

The sound input/output unit 46 includes a microphone, a sound input terminal, or the like for inputting a sound, and a speaker, a sound output terminal, or the like for outputting a sound. The sound input/output unit 46 outputs, for example, a sound corresponding to the object person sound information acquired from the server 30, and accepts an input of distribution sound information for distribution to the object person.

Note that each of the object person terminal 10, the detection terminal 20, the server 30, and the guardian terminal 40 may include a component other than the above-described components, or may not include part of the above-described components.

<Outline of Processing>

Next, a flow of processing in the emergency communication system will be described.

<Location Specifying Processing>

Figure 6:
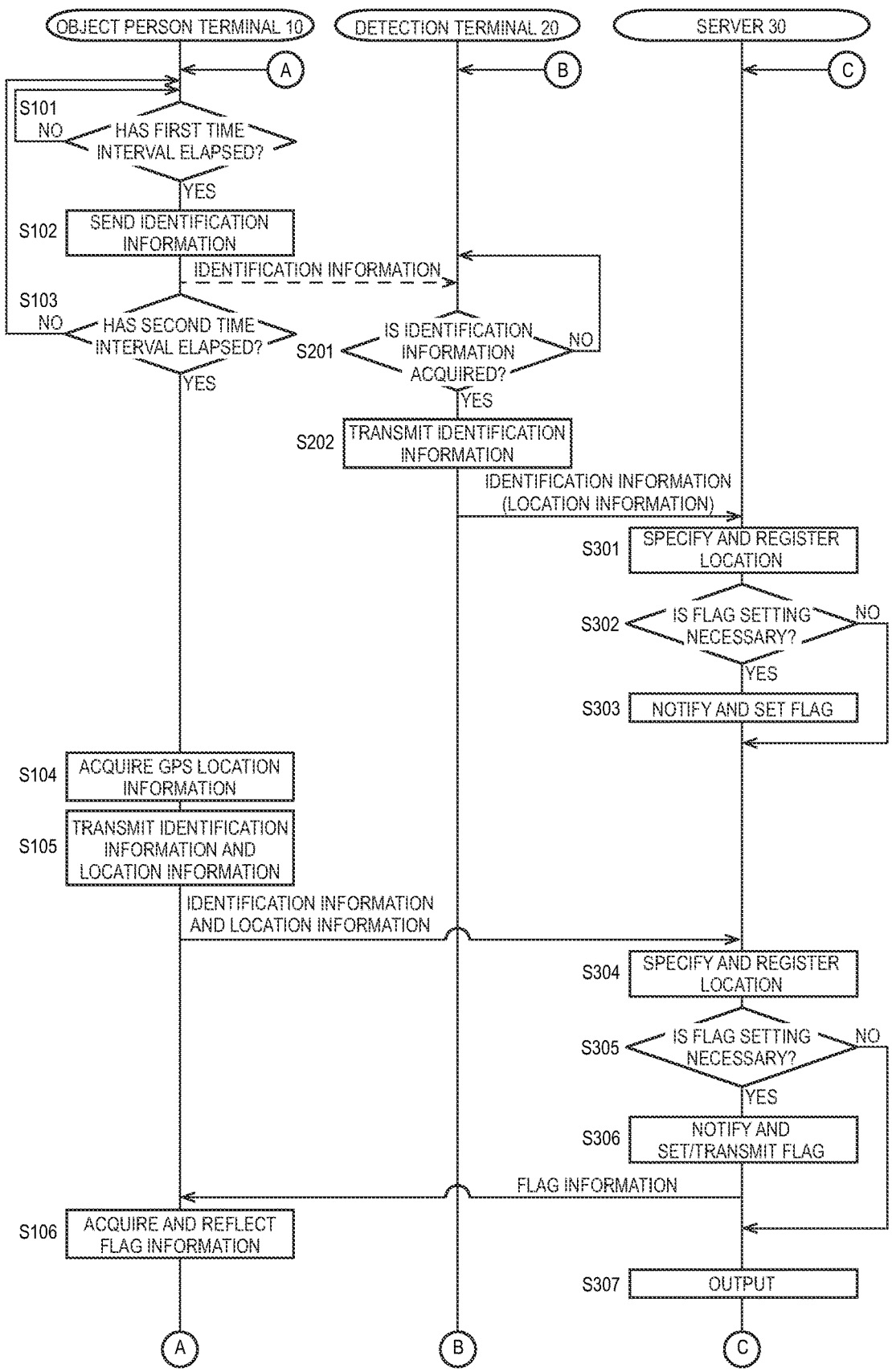
FIG. 6 is a sequence chart illustrating a flow of location specifying processing executed in the emergency communication system.
Figure 7A:
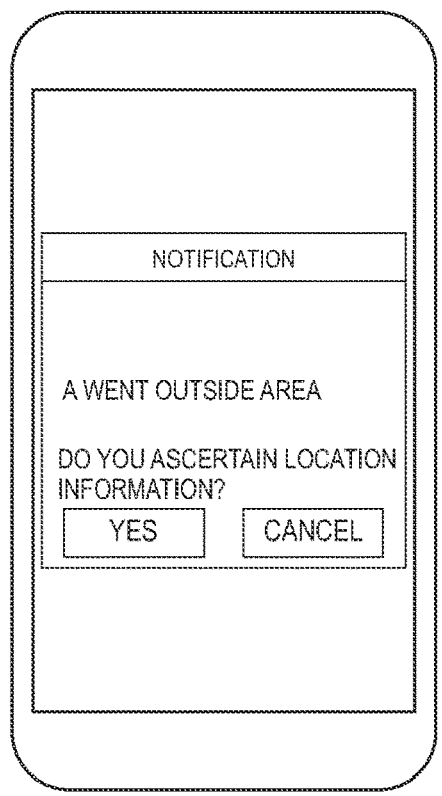
FIGS. 7a-7c are diagrams illustrating an example of a screen displayed on the guardian terminal.
Figure 7B:
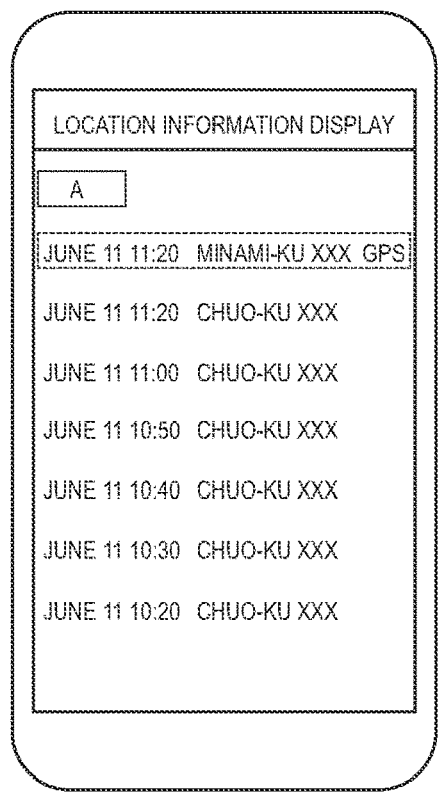
Figure 7C:
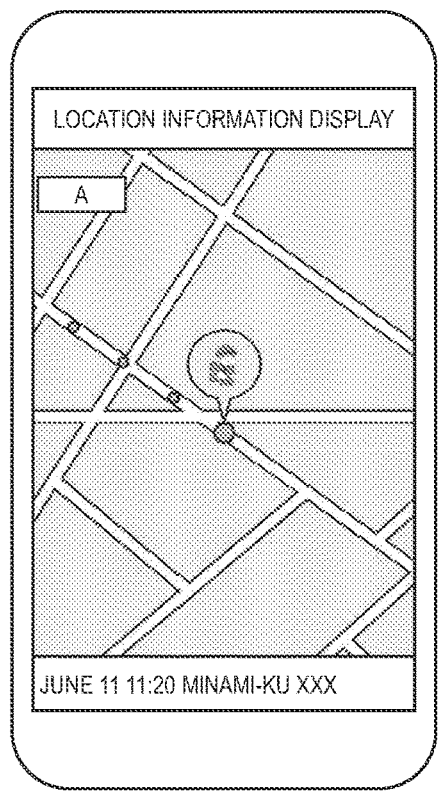

FIG. 6 is a sequence chart illustrating a flow of location specifying processing executed in the emergency communication system. FIGS. 7a-7c are diagrams illustrating an example of a screen displayed on the guardian terminal.

First, processing of the object person terminal 10 will be described.

As illustrated in FIG. 6, the object person terminal 10 determines whether the first time interval has elapsed (step S101). When the first time interval has not elapsed (step S101: NO), the object person terminal 10 waits until the first time interval elapses.

When the first time interval has elapsed (step S101: YES), the object person terminal 10 outputs a signal for performing the short-range wireless communication by the first communication unit 13, and transmits identification information for identifying the object person terminal 10 via the short-range wireless communication to the surroundings (step S102). Since a relatively short time interval of about 3 seconds is set as the first time interval, the object person terminal 10 constantly transmits the identification information in a short cycle. As the first time interval, a constant value may be set as a fixed value, or a variable value may be set. Note that the first communication unit 13 may output a radio wave for performing the short-range wireless communication at the first time interval, and transmit the identification information to another party when communication with the other party is established. Alternatively, the first communication unit 13 may transmit the identification information at the first time interval regardless of whether communication with the other party is established.

Subsequently, the object person terminal 10 determines whether the second time interval has elapsed (step S103). When the second time interval has not elapsed (step S103: NO), the object person terminal 10 returns to the processing of step S101 and repeats the processing of performing the short-range wireless communication.

When the second time interval has elapsed (step S101: YES), the object person terminal 10 acquires location information of the object person terminal 10 on the basis of a signal from the GPS satellite by the second communication unit 14 using a known technique (step S104). Then, the object person terminal 10 transmits the location information of the object person terminal 10 acquired in the processing of step S104 and the identification information for identifying the object person terminal 10 to the server 30 via the long-range wireless communication (step S105). Since a relatively long time interval of about one hour is set as the second time interval, the object person terminal 10 transmits, while transmitting the identification information via the short-range wireless communication in a short cycle as described above, the identification information and the location information acquired by the GPS function to the server 30 via the long-range wireless communication in a long cycle such as every hour or the like. Note that, as described above, when a value corresponding to the moving state and the moving speed of the object person terminal 10 is set as the second time interval, the object person terminal 10 uses the second time interval corresponding to the moving state and the moving speed of the object person terminal 10 determined from the detection information of the acceleration sensor or the like.

Subsequently, the object person terminal 10, when communicating with the server 30 and having acquired time setting flag information for changing the second time interval from the server 30 in the processing of step S105, changes the second time interval on the basis of the content of the flag information (step S106). Moreover, the object person terminal 10, when communicating with the server 30 and having acquired the emergency flag or the sound distribution flag in the processing of step S105, executes processing corresponding to each flag to be described later.

The object person terminal 10 repeatedly executes the processing of steps S101 to S106.

Next, processing of the detection terminal 20 will be described.

The detection terminal 20 detects the object person terminal 10 with which communication is possible, and determines whether identification information has been acquired from the object person terminal 10 (step S201). When not having acquired the identification information (step S201: NO), the detection terminal 20 continues processing for detecting the object person terminal 10 and acquiring the identification information until the identification information can be acquired.

When having acquired the identification information (step S201: YES), the detection terminal 20 transmits the acquired identification information to the server 30 (step S202).

Here, when the detection terminal 20 is a fixed terminal (detection terminal 20a), the detection terminal 20a transmits information for identifying the detection terminal 20a to the server 30 together with the identification information. This is because the information on the location of each detection terminal 20a is stored in advance in the storage unit 32 of the server 30 in association with the information for identifying the detection terminal 20a. As a result, the server 30 can use the information for identifying the detection terminal 20a received together when receiving the identification information of the object person terminal 10 from the detection terminal 20a, to acquire the information on the location of the detection terminal 20a from the storage unit 32.

On the other hand, when the detection terminal 20 is a mobile terminal (detection terminal 20b), the detection terminal 20b uses the GPS function, to acquire information on the location of each detection terminal 20b on the basis of a signal from the GPS satellite, and transmits the information to the server 30 together with the identification information. As a result, the server 30 can acquire the information indicating the location of the detection terminal 20b on the basis of the information received together when receiving the identification information of the object person terminal 10 from the detection terminal 20b.

The detection terminal 20 repeatedly executes the processing of steps S201 to S202.

Next, processing of the server 30 will be described.

The server 30 receives the identification information of the object person terminal 10 from the detection terminal 20, acquires the information on the location of the detection terminal 20 as described above, and specifies the location of the object person terminal 10 corresponding to the identification information on the basis of the acquired information (step S301). The server 30 registers the identification information of the object person terminal 10 and the specified location in the storage unit 32 in association with one other.

Subsequently, the server 30 determines whether setting of various flags is necessary on the basis of the state of specifying the location of the object person terminal 10 in the processing of step S301 (step S302). For example, the server 30 determines whether it is necessary to change the frequency of location information acquisition using the GPS function, that is, the second time interval on the basis of the state of specifying the location of the object person terminal 10, and determines whether it is necessary to set the time setting flag. Moreover, the server 30 determines whether it is necessary to set the emergency flag on the basis of the state of specifying the location of the object person terminal 10. Note that the server 30 may individually determine whether it is necessary to set the time setting flag and the emergency flag on the basis of independent conditions, correspondingly.

For example, the server 30, when the location of the specified object person terminal 10 is included in a predetermined range within the watching area set in advance, determines that it is necessary to set the time setting flag and the emergency flag for the object person terminal 10. Note that different regions can be set for the predetermined range for setting the time setting flag and the predetermined range for setting the emergency flag, respectively. For example, the predetermined range for setting the time setting flag is a peripheral region of the watching area where the object person terminal 10 is expected to go outside the watching area, and a region including a station or a bus stop where the object person can get on and off transportation such as a train, a bus, and the like that can move a long distance, or a railroad, a bus road, and the like on which a train or a bus travels. In addition, the predetermined range for setting the time setting flag and the emergency flag is, for example, a region in which the degree of danger is determined to be high from an attribute (residential area, office area, shopping street, nightlife, or the like), a security level, a traffic volume level, a sufficiency level of watching (degree of sufficiency of the detection terminals 20a and 20b), an incident/accident occurrence degree, a suspicious person information occurrence degree, a disaster occurrence degree, and the like of the section. The degree of danger for each region can be dynamically changed. For example, when an incident, an accident, or a disaster occurs, any desired range can be set to a region in which the degree of danger is high, as an incident/accident occurrence section or a disaster occurrence section.

In addition, the server 30 may determine that the second time interval of the object person terminal 10 needs to be changed to be short when the object person terminal 10 is determined to be moving from a predetermined range such as a peripheral region or the like within the watching area toward the outside of the watching area on the basis of transition of the specified position of the object person terminal 10. This is because the object person terminal 10 is highly likely to go outside the watching area from now.

Furthermore, the server 30 may determine, on the basis of a specified location of the object person terminal 10, a section including the location, acquire a value of the second time interval set in advance according to the environment of the section, and determine that the second time interval of the object person terminal 10 needs to be changed when the acquired value is different from the value used in the object person terminal 10. As the environment of the section, for example, an attribute of the section (residential area, office area, shopping street, nightlife, or the like), a security level, a traffic volume level, a sufficiency level of watching (degree of sufficiency of the detection terminals 20a and 20b), an incident/accident occurrence degree, a suspicious person information occurrence degree, a disaster occurrence degree, and the like of the section are set, and according to the environment of the section, the second time interval may be set for each object person terminal 10. Furthermore, the attribute of the section can be dynamically changed. For example, when an incident, an accident, or a disaster occurs, any desired range can be set as an incident/accident occurrence section or a disaster occurrence section.

Furthermore, the server 30 may determine, on the basis of a specified location of the object person terminal 10, a section including the location, acquire a value of the second time interval set in advance according to a time zone for the section, and when the acquired value is different from the value used in the object person terminal 10, determine that the second time interval of the object person terminal 10 needs to be changed. For example, for a section in which it is relatively safe in the daytime but the degree of danger during night is high from the viewpoint of the security level, the traffic volume level, the sufficiency level of watching, and the like, the second time interval in the daytime time zone can be set to be long and the second time interval in the nighttime time zone can be set to be short.

Furthermore, when the identification information transmitted from the first communication unit 13 of the object person terminal 10 is not acquired for a predetermined time, the server 30 may determine that the time setting flag and the emergency flag of the object person terminal 10 corresponding to the identification information need to be set.

Furthermore, the server 30 may set the time setting flag and the emergency flag of the object person terminal 10 when the object person terminal 10 moves from the predetermined range within the watching area to a range other than the predetermined range within the watching area on the basis of the transition of the location of the specified object person terminal 10.

Note that the server 30 may execute a plurality of various determination methods as described above in combination.

When it is determined that the various flags do not need to be set (step S302: NO), the server 30 proceeds to the processing of step S304 or step S301. The server 30 returns to the processing of step S301 when receiving the identification information from the detection terminal 20, and proceeds to the processing of step S304 when receiving the identification information from the object person terminal 10.

When it is determined that the various flags need to be set (step S302: YES), the server 30 notifies the guardian terminal 40 associated in advance with the object person terminal 10, and sets the time setting flag and the emergency flag of the object person terminal 10 (step S303). By setting the time setting flag and the emergency flag as described above, the object person terminal 10, when communicating with the server by the second communication unit 14, can acquire each of the flags described above, and can execute the corresponding processing on the basis of the content of the acquired flag.

Here, the notification to the guardian terminal 40 is executed, for example, by displaying a notification screen as illustrated in FIG. 7a on the display unit 44 of the guardian terminal 40. Alternatively, the notification to the guardian terminal 40 may be executed by transmitting a message to an electronic mail address registered in advance or an account of various messaging applications, SNS services, or the like.

For example, when the "Yes" button is pressed on the screen illustrated in FIG. 7a, the server 30 transmits the location information of the corresponding object person to the guardian terminal 40 (corresponding to the processing of step S307 described later). As a result, for example, a location information display screen as illustrated in FIG. 7b is displayed on the display unit 44 of the guardian terminal 40.

In the screen of FIG. 7b, the transition of the location information of "A" who is the object person is displayed in time series from the lower side to the upper side of the screen. In this screen, it is indicated that A, who was located in "Chuo-ku", which is a watching area, from 9:00 AM to 11:00 AM, is located in "Minami-ku", which is outside the watching area, at 11:20 AM is sensed from GPS information. Furthermore, by pressing the display of each record indicating the location information on the screen of FIG. 7b, the detailed location information including map information may be displayed as illustrated in the screen of FIG. 7c. Note that the display order and display contents of the screen are not limited to the above examples, and the location information of the object person can be displayed by various methods. For example, the screen of FIG. 7c may be displayed when the "YES" button is pressed on the screen of FIG. 7a, and the screen of FIG. 7b may be displayed when a predetermined operation such as pressing of a history button, or the like is performed.

In addition, the server 30 specifies the location of the object person terminal 10 corresponding to the identification information on the basis of the identification information and the location information transmitted from the second communication unit 14 of the object person terminal 10 (step S304). The server 30 registers the identification information of the object person terminal 10 and the specified location in the storage unit 32 in association with one other.

Subsequently, the server 30 determines whether the various flags need to be set on the basis of the state of specifying the location of the object person terminal 10 in the processing of step S304 (step S305).

For example, the server 30 determines whether the various flags need to be set by a method similar to the processing of step S302 described above on the basis of the location of the object person terminal 10 specified in the processing of step S304.

Furthermore, when the location of the object person terminal specified in the processing of step S304 is outside the watching area, the server 30 may determine that the various flags of the object person terminal 10 need to be set.

When it is determined that the various flags do not need to be set (step S305: NO), the server 30 proceeds to the processing of step S307.

When it is determined that the various flags need to be set (step S305: YES), the server 30 notifies the guardian terminal 40 associated in advance with the object person terminal 10, and sets the time setting flag and the emergency flag of the object person terminal 10, and transmits the time setting flag to the object person terminal 10 (step S306). As a result, the object person terminal 10 can acquire each flag described above and execute corresponding processing on the basis of the content of the acquired flag.

Subsequently, the server 30 outputs the information registered in the processing of step S301 and step S304, the information notified in the processing of step S303 and step S306, and the like in a browsable manner on the guardian terminal 40 (step S307). This output processing can be executed at any desired timing on the basis of a request or the like from the guardian terminal 40.

Note that, in the sequence chart of FIG. 6, the description has been given as a flow that the server 30 receives the identification information of the object person terminal 10 directly from the object person terminal 10 after receiving the identification information of the object person terminal 10 via the detection terminal 20, but in practice, when the identification information is received from the detection terminal 20, the processing of step S301 is executed and when the identification information is received from the object person terminal 10, the processing of step S304 is executed. Furthermore, in an actual use environment of the present system, it is assumed that a plurality of the object person terminal 10 and a plurality of the detection terminals 20 are provided, and the server 30 executes the above-described processing for each of the plurality of the object person terminal 10 and each of the plurality of the detection terminals 20.

<Emergency Information Acquisition Processing>

When the emergency acceptance unit 151 of the object person terminal 10 accepts the instruction regarding the occurrence of the emergency, regardless of the processing flow of the sequence chart of FIG. 6, the object person terminal 10 executes the processing of steps S104 and S105, acquires the location information using the GPS function, and transmits a notification indicating the occurrence of a matter of emergency including the identification information and the location information to the server 30. At that time, the object person terminal 10 can acquire ambient sounds and images (video) around the object person terminal 10 by the acquisition unit 16 and transmit information indicating the sounds and the images (video) to the server 30.

In addition, the instruction regarding the occurrence of a matter of emergency is not limited to a form of being accepted in the emergency acceptance unit 151 of the object person terminal 10, and may be accepted in a form in which the emergency flag indicating the occurrence of a matter of emergency is set in the server 30. In this case, when the object person terminal 10 periodically communicates with the server 30 and acquires the emergency flag, the instruction for notifying the occurrence of a matter of emergency is accepted in the object person terminal 10, and processing of acquiring location information using the GPS function and transmitting the location information to the server 30, or the like is executed.

Hereinafter, information acquisition processing in a case of emergency will be described in detail.

Figure 8:
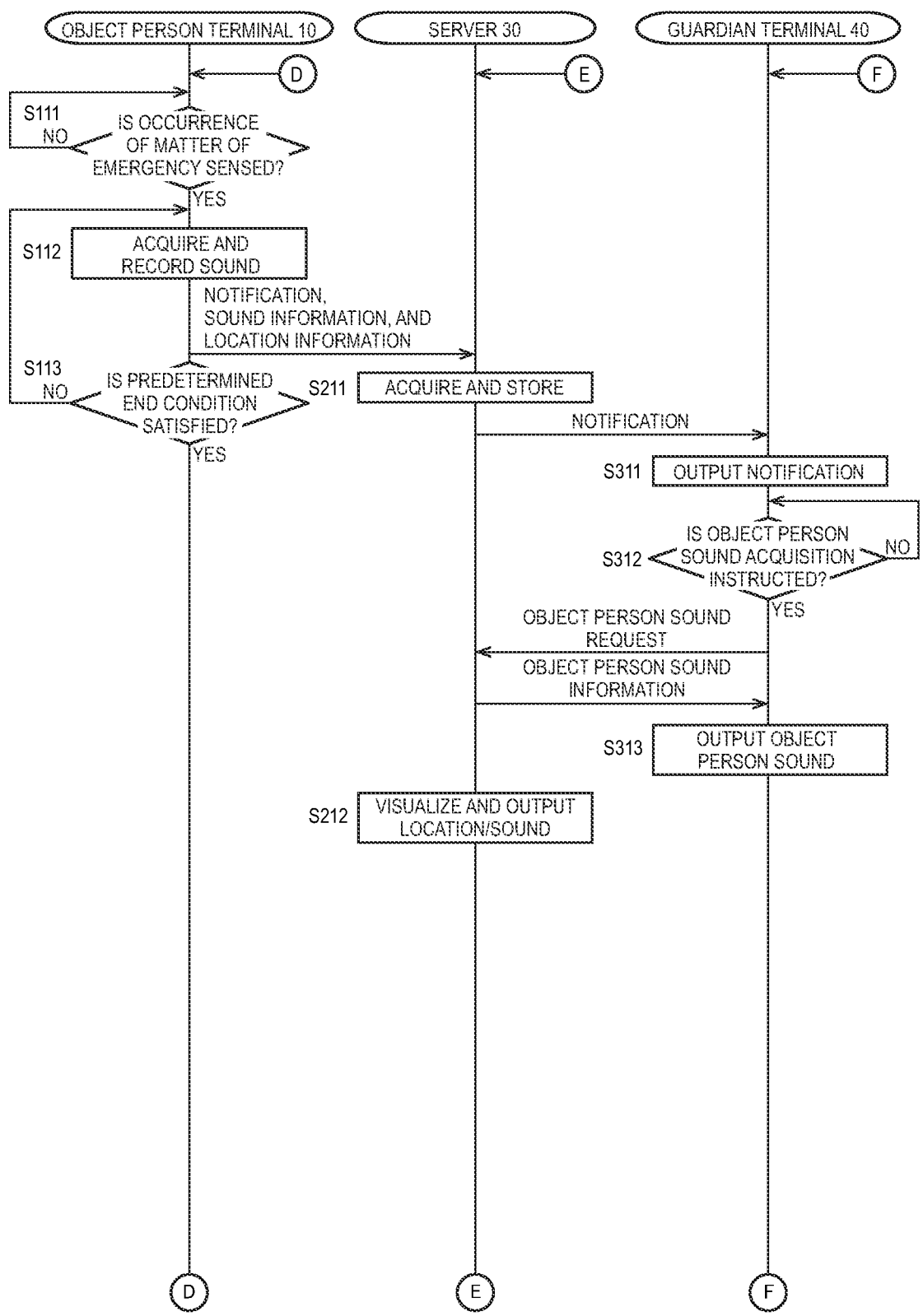
FIG. 8 is a sequence chart illustrating a flow of emergency information acquisition processing executed in the emergency communication system.
Figure 9:
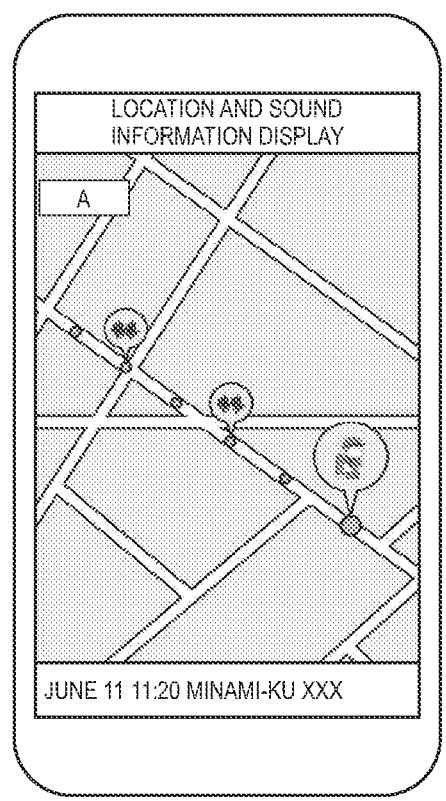
FIG. 9 is a diagram illustrating an example of a screen in which a location of the object person terminal and display corresponding to the object person sound information recorded at the location are visualized in association with each other.

FIG. 8 is a sequence chart illustrating a flow of the emergency information acquisition processing executed in the emergency communication system. FIG. 9 is a diagram illustrating an example of a screen in which a location of the object person terminal and display corresponding to the object person sound information recorded at the location are visualized in association with each other.

First, processing of the object person terminal 10 will be described.

As illustrated in FIG. 8, the object person terminal 10 determines whether the occurrence of a matter of emergency has been sensed (step S111). As described above, the object person terminal 10 senses the occurrence of a matter of emergency by accepting the instruction by the emergency acceptance unit 151, detecting an abnormal motion of the object person on the basis of outputs of the various sensors, acquiring the emergency flag set on the basis of the location information of the object person terminal 10, and the like.

When the occurrence of an emergency has not been sensed (step S111: NO), the object person terminal 10 waits until the occurrence of a matter of emergency is sensed.

When the occurrence of a matter of emergency is sensed (step S111: YES), the object person terminal 10 records the ambient sounds as the object person sound information for a predetermined time at a predetermined interval (step S112). In addition, the object person terminal 10 transmits the recorded object person sound information to the server 30 together with the notification regarding the occurrence of a matter of emergency. The object person terminal 10 may acquire the location information of the object person terminal 10 at the time of recording the object person sound information and transmit the location information to the server 30 together with the object person sound information.

The object person terminal 10 determines whether a predetermined end condition is satisfied (step S113), and if the end condition is not satisfied (step S113: NO), repeats the processing of step S112, and if the end condition is satisfied (step S113: YES), ends the processing, and returns to the processing of step S111. As the end condition, for example, it can be set that cancellation of the matter of emergency has been ascertained, or the like, by a predetermined operation in the object person terminal 10, unsetting of the emergency flag of the server 30, or the like.

Next, processing of the server 30 and the guardian terminal 40 will be described.

The server 30 acquires various types of information transmitted from the object person terminal 10 and stores the information in the storage unit 32 (step S211). In addition, the server 30 notifies the guardian terminal 40 of the occurrence of a matter of emergency and the acquisition of the object person sound information from the object person terminal 10.

The guardian terminal 40 outputs the notification transmitted from the server 30 via the display unit 44 or the sound input/output unit 46 (step S311).

The guardian terminal 40 determines whether an instruction for acquiring the object person sound is accepted (step S312). The instruction for acquiring the object person sound, for example, is accepted by a predetermined operation performed on the operation acceptance unit 45 by a guardian who has ascertained the notification output by the display unit 44 or the sound input/output unit 46.

When not having accepted the instruction for acquiring the object person sound (step S312: NO), the guardian terminal 40 waits until the instruction is accepted.

When the instruction for acquiring the object person sound is accepted (step S312: YES), the guardian terminal 40 requests the object person sound information from the server 30, and the server 30 transmits the stored object person sound information to the guardian terminal 40.

The guardian terminal 40 outputs a sound corresponding to the object person sound information transmitted from the server 30 via the sound input/output unit 46 (step S313).

Furthermore, the server 30 outputs, in association with the information on the location of the object person terminal 10, the display corresponding to the object person sound information recorded at the location, to be visualized (step S212). For example, the server 30 outputs information for displaying a screen as illustrated in FIG. 9. The server 30 transmits the information to the guardian terminal 40 in response to, for example, a request from the guardian terminal 40. The guardian terminal 40 can display the screen as illustrated in FIG. 9 on the display unit 44 on the basis of the transmitted information. In the screen of FIG. 9, the transition of the location of the object person terminal 10 is illustrated as a trajectory, and an icon indicating a sound (waveform in the example of FIG. 9) is displayed in association with the location of the object person terminal 10 at the time when the object person sound information is acquired. For example, when a guardian or the like selects an icon indicating a sound, a corresponding sound is reproduced.

<Sound Distribution Processing to Object Person>

Processing of asynchronously distributing a sound from the guardian to the object person, in a case where a matter of emergency occurs to the object person, for example, will be described.

Figure 10:
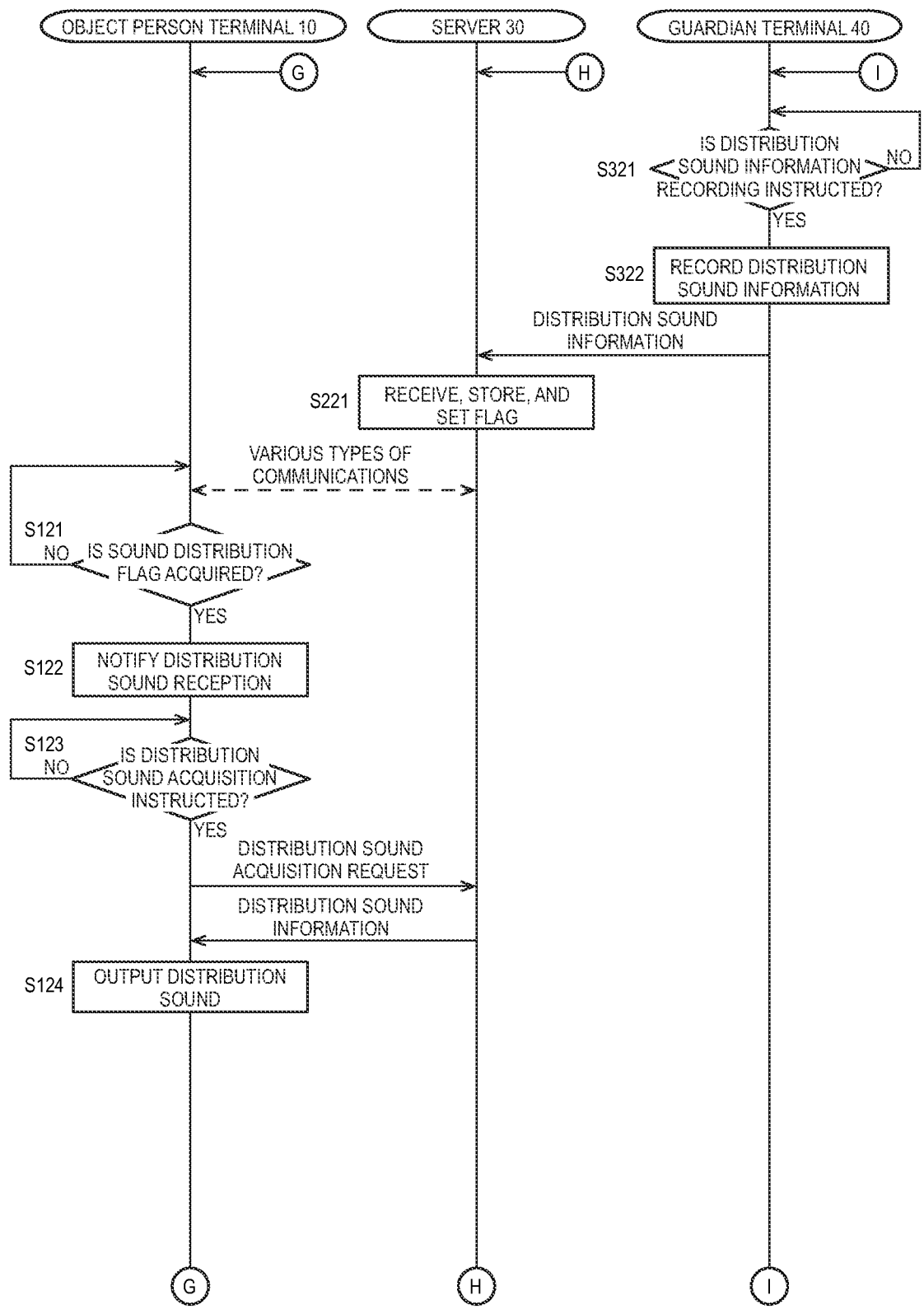
FIG. 10 is a sequence chart illustrating a flow of sound distribution processing to the object person executed in the emergency communication system.

FIG. 10 is a sequence chart illustrating a flow of the sound distribution processing to the object person executed in the emergency communication system.

As illustrated in FIG. 10, the guardian terminal 40 determines whether an instruction for recording the distribution sound information has been accepted from the guardian or the like (step S321).

When the instruction for recording the distribution sound information has not been accepted (step S321: NO), the guardian terminal 40 waits until the instruction is accepted.

When the instruction for recording the distribution sound information has been accepted (step S321: YES), the guardian terminal 40 accepts a sound input of the guardian or the like via the sound input/output unit 46 and records the sound input as the distribution sound information (step S322). The guardian terminal 40 transmits the recorded distribution sound information to the server 30.

The server 30 receives the distribution sound information transmitted from the guardian terminal 40 and stores the received distribution sound information in the storage unit 32, and sets, in the storage unit 32, the sound distribution flag for transmitting the distribution sound information to the object person terminal 10 associated in advance with the guardian terminal 40 (step S221).

The object person terminal 10 determines, when performing various types of communications with the server 30, whether the sound distribution flag set in the server 30 has been acquired (step S121).

When the sound distribution flag has not been acquired (step S121: NO), the object person terminal 10 waits until the sound distribution flag is acquired while continuing the various types of communications.

When the sound distribution flag has been acquired (step S121: YES), the object person terminal 10 notifies the object person that the distribution sound information has been received in the server 30 (step S122).

The object person terminal 10 determines whether the instruction for acquiring the distribution sound information has been accepted from the object person or the like (step S123).

When the instruction has not been accepted (step S123: NO), the object person terminal 10 waits until the instruction is accepted.

When the instruction has been accepted (step S123: YES), the object person terminal 10 requests the distribution sound information from the server 30, and the server 30 transmits the stored distribution sound information to the object person terminal 10.

The object person terminal 10 outputs a sound corresponding to the distribution sound information acquired from the server 30 via the sound output unit 171 (step S124).

Note that the present invention is not limited only to the above-described embodiment, and various modifications can be made within the scope of the claims.

For example, in the above embodiment, an example has described in which the object person terminal 10 functions as the sensing unit, but the present invention is not limited thereto. For example, the server 30 may function as a sensing unit.

In the above embodiment, an example has been described in which whether each flag needs to be set is determined and each flag is set in the server 30, but the above determination and setting of each flag may be executed by the object person terminal 10. In this case, the object person terminal 10 functions as a setting unit.

Furthermore, in the processing of step S104 of FIG. 6, the object person terminal 10 has been described as an object person terminal that uses the GPS function to acquire the location information when the second time interval has elapsed. However, when it can be determined from the information of the acceleration sensor or the like that the location of the object person terminal 10 has not changed from the location at which the location information was previously acquired by using the GPS function, the use of the GPS function may be omitted and the previously acquired location information may be used as it is. As a result, power consumption by the GPS function of the object person terminal 10 can be further suppressed.

Furthermore, in the above embodiment, an example has been described in which each component such as the server 30 or the like included in the emergency communication system is configured as one independent device, but the configuration of the device is not limited thereto. Each component may include a plurality of devices, or may be included in a device having another function. For example, the server 30 may be configured to be distributed on a cloud server that includes a large number of servers. Alternatively, an application having the function of the server 30 may be installed in the detection terminal 20, the guardian terminal 40, or the like, and the processing of the server 30 may be executed in the detection terminal 20 or the guardian terminal 40.

Furthermore, in the above embodiment, an example has been described in which the object person terminal 10 is a small dedicated terminal that can be driven by a button battery, but the embodiment is not limited thereto. The object person terminal 10 may be a smartphone, a tablet terminal, or the like, or may be a wearable information terminal worn on an arm, a head, or the like of the object person, an embedded information terminal, or the like. Also in this case, by applying the embodiment as described above, the location of the object person is accurately, reliably, and efficiently specified while the power consumption is significantly reduced.

Furthermore, the processing of the emergency communication system according to the above-described embodiment may include steps other than the above-described steps, or may not include part of the above-described steps. In addition, the order of the steps is not limited to that of the above-described embodiment. Furthermore, each step may be combined with another step and executed as one step, may be included in another step and executed, or may be divided into a plurality of steps and executed.

Means and methods for performing various types of processing in the emergency communication system according to the above-described embodiment can be achieved by either a dedicated hardware circuit or a programmed computer. The above program may be provided by, for example, a computer-readable recording medium such as a flexible disk, a CD-ROM, or the like, or may be provided online via a network such as the Internet, or the like. In this case, the program recorded in the computer-readable recording medium is usually transferred to and stored in a storage unit such as a hard disk. Furthermore, the above program may be provided as independent application software, or may be, as one function of the emergency communication system, incorporated into software of a device of the emergency communication system.

The emergency communication system according to the present embodiment configured as described above includes the object person terminal 10, the detection terminal 20, the server 30, and the sensing unit that senses the occurrence of a matter of emergency. The object person terminal 10 transmits the identification information for identifying the object person terminal 10 via the short-range wireless communication, acquires the location information of the object person terminal 10 on the basis of a signal from the GPS satellite, and transmits the identification information and the location information to the server 30 via the long-range wireless communication the communication distance of which is longer than a communication distance of the short-range wireless communication. The detection terminal 20 detects an object person terminal 10 with which communication is possible, and acquires identification information sent from the object person terminal 10 when the object person terminal 10 is detected, to transmit the identification information to the server 30. The server 30 acquires the identification information transmitted from the detection terminal 20 and the information on the location of the detection terminal 20, and specifies the location of the object person terminal 10 on the basis of the acquired identification information and information on the location of the detection terminal 20 or the identification information and the location information transmitted from the object person terminal 10. The object person terminal 10, when the occurrence of a matter of emergency is sensed by the sensing unit, records ambient sounds as object person sound information, and transmits the recorded object person sound information to the server 30. As a result, while accurately and reliably detecting the location of the object person such as a child or an elderly person, it is possible to receive contact from the object person and appropriately grasp the state of the object person when a matter of emergency occurs.

In addition, the object person terminal 10 repeatedly records ambient sounds at a predetermined interval after the occurrence of a matter of emergency is sensed. As a result, it is possible to appropriately grasp the state of the object person and the change in the state for a long period of time while suppressing the power consumption of the object person terminal 10 to achieve its power saving and long life.

In addition, the server 30 notifies the guardian terminal 40 of the guardian of the object person, of the object person sound information transmitted from the object person terminal 10. As a result, when a matter of emergency occurs to the object person, the guardian of the object person can quickly and easily receive contact from the object person and grasp the state of the object person.

In addition, the object person terminal 10 includes the emergency acceptance unit 151 for accepting an instruction regarding the occurrence of a matter of emergency, and when the instruction is accepted in the emergency acceptance unit 151, the occurrence of a matter of emergency is sensed. As a result, even when a matter of emergency occurs, the object person can transmit the object person sound information by an intuitive and simple operation.

In addition, the object person terminal 10 includes a sensor for detecting a motion of the object person terminal 10, and the occurrence of a matter of emergency is sensed on the basis of an output of the sensor. As a result, for example, even when a matter of emergency occurs and the object person fails to operate the emergency acceptance unit 151, the occurrence of a matter of emergency can be appropriately sensed on the basis of the motion of the object person terminal 10.

In addition, the emergency communication system sets the emergency flag to indicating the occurrence of a matter of emergency to the server 30, and when the object person terminal 10 communicates with the server 30 and acquires the emergency flag from the server 30, the occurrence of a matter of emergency is sensed. As a result, for example, even when the object person does not operate the emergency acceptance unit 151, it is possible to sense the occurrence of a matter of emergency and acquire ambient sounds around the object person terminal 10.

Furthermore, the emergency communication system, when the location of a specified object person terminal 10 is included in a predetermined range within the watching area, sets the emergency flag for the object person terminal 10. As a result, for example, when the object person is in a region with a high degree of danger within the watching area, the occurrence of a matter of emergency can be sensed automatically and the surrounding state of the object person terminal 10 can be grasped, even if the object person does not perform any operation.

Furthermore, the emergency communication system, when the location of a specified object person terminal 10 is outside the watching area, sets the emergency flag for the object person terminal 10. As a result, for example, when the object person goes outside the watching area, the occurrence of a matter of emergency can be sensed automatically and the surrounding state of the object person terminal 10 can be grasped, even if the object person does not perform any operation.

Furthermore, when the identification information transmitted from the first communication unit 13 of the object person terminal 10 is not acquired for a predetermined time, the emergency communication system sets the emergency flag for the object person terminal 10. As a result, for example, when the object person goes outside the watching area, the occurrence of a matter of emergency can be sensed automatically and the surrounding state of the object person terminal 10 can be grasped, even if the object person does not perform any operation.

Furthermore, the server 30 can receive the distribution sound information to be distributed to the object person terminal 10, and when the distribution sound information is received, sets the sound distribution flag. The object person terminal 10, when communicating with the server 30 and receiving the sound distribution flag from the server 30, notifies the object person that the distribution sound information has been received. The object person terminal 10, when accepting the instruction for acquiring the distribution sound information, communicates with the server 30 to acquire the distribution sound information, and outputs a sound corresponding to the acquired distribution sound information. As a result, the guardian or the like can distribute any desired sound message to the object person terminal 10. Since the sound is distributed asynchronously, the guardian can transmit the distribution sound at any desired timing regardless of the state of the object person. Furthermore, the object person can listen to the distribution sound at a convenient timing after ascertaining the notification. Furthermore, the object person terminal 10 does not need to be on standby at all times to receive the contact, and it is sufficient to ascertain the sound distribution flag of the server 30 at a predetermined timing or acquire the distribution sound information on the basis of an instruction of the object person, and thus power consumption of the object person terminal 10 can be suppressed to achieve power saving and long life.

In addition, the object person terminal 10, when the occurrence of a matter of emergency is sensed, further records ambient images, and transmits the recorded images to the server. As a result, it is possible to more appropriately grasp the state of the object person when a matter of emergency occurs.

In addition, the emergency communication system outputs, in association with the information on the location of the specified object person terminal, the display corresponding to the object person sound information recorded at the location, to be visualized. As a result, the guardian or the like can ascertain, while ascertaining locations and a situation of moving of the object person through the visualized display, the object person sound information recorded at each location, and thus can more effectively grasp the state of the object person.

In addition, the object person terminal 10 outputs a signal for performing the short-range wireless communication at a first time interval, acquires location information at a second time interval longer than at least the first time interval, and transmits the identification information and the location information to the server. As a result, during normal time during which the object person terminal 10 is present within the watching area, it is possible to execute location specification of the object person terminal 10 by a power-saving and highly accurate method using the short-range wireless communication, whereas, during non-normal time during which the object person terminal 10 is not present within the watching area, it is possible to execute the location specification of the object person terminal 10 using the GPS function at an appropriate frequency. Therefore, by appropriately utilizing advantages of the GPS function when necessary while solving two disadvantages that are battery consumption due to power consumption and difficulty in securing stability of location accuracy, which are major problems of location specification by the GPS function, it is possible to constantly ascertain the location of the object person such as a child or an elderly person in a stable and efficient manner, to ensure safety of the object person and peace of mind of the guardian.

In the emergency communication system, the detection terminal 20a is installed at a predetermined location included in the watching area, and transmits information for identifying the detection terminal 20a to the server 30. Then, the server 30 uses the information for identifying the detection terminal 20a transmitted from the detection terminal 20a, to acquire information on the location of the detection terminal 20a from the storage unit 32 in which the information for identifying the detection terminal 20a and the location of the detection terminal 20a are stored in advance in association with each other. As a result, it is possible to use the detection terminal 20a, which is a fixed terminal installed in the watching area and in which the location information is stored in advance, to accurately specify the location of the object person terminal.

Furthermore, in the emergency communication system, the detection terminal 20b is provided in a mobile body moving in a region including the watching area, and acquires information on the location of the detection terminal 20b on the basis of a signal from the GPS satellite, and transmits the information to the server 30. Then, the server 30 acquires the information on the location of the detection terminal 20b on the basis of the information transmitted from the detection terminal 20b. As a result, an information terminal such as a smartphone carried by a watching person moving within the watching area or a tablet PC or the like installed in a moving taxi or the like can be used as the detection terminal. Therefore, the location of the object person terminal 10 can be accurately specified without installing fixed terminals throughout the watching area.

REFERENCE SIGNS LIST

10 Object person terminal
11 Control unit
12 Storage unit
13 First communication unit
14 Second communication unit
15 Acceptance unit
151 Emergency acceptance unit
152 Acquisition instruction acceptance unit
16 Acquisition unit
17 Output unit
171 Sound output unit
172 Light output unit
20, 20a, 20b Detection terminal
21 Control unit
22 Storage unit
23 Communication unit
24 Detection unit
30 Server
31 Control unit
32 Storage unit
33 Communication unit
40 Guardian terminal
41 Control unit
42 Storage unit
43 Communication unit
44 Display unit
45 Operation acceptance unit
46 Sound input/output unit

The invention claimed is:

1. An emergency communication system comprising:
an object person terminal carried by an object person;
a detection terminal that is present in a region including a watching area of the object person set in advance, and detects the object person terminal with which communication is possible via short-range wireless communication;
a server that registers information transmitted from the object person terminal and the detection terminal; and
a sensing unit that senses occurrence of a matter of emergency, wherein the object person terminal includes:
a first communication unit that transmits identification information for identifying the object person terminal via the short-range wireless communication and outputs, at a pre-set first time interval, a signal for performing the short-range wireless communication;
a second communication unit that acquires, at a pre-set second time interval, location information of the object person terminal based on a signal from a GPS satellite, and transmits the identification information and the location information to the server via long-range wireless communication a communication distance of which is longer than a communication distance of the short-range wireless communication; and
a recording unit that records ambient sounds as object person sound information, wherein the detection terminal includes:
a detection unit that detects the object person terminal with which communication is possible; and
a transmission unit that, when the object person terminal is detected by the detection unit, acquires the identification information transmitted from the first communication unit and transmits the identification information to the server,
wherein the server includes:
an acquisition unit that acquires the identification information transmitted from the detection terminal and information on a location of the detection terminal; and
a specification unit that specifies a location of the object person terminal based on the identification information and the information on the location of the detection terminal acquired by the acquisition unit, or the identification information and the location information transmitted from the second communication unit of the object person terminal, wherein the second communication unit of the object person terminal transmits, when occurrence of a matter of emergency is sensed by the sensing unit, the object person sound information recorded by the recording unit to the server, the emergency communication system further comprising:
a setting unit that sets an emergency flag indicating occurrence of a matter of emergency to the server, wherein
the sensing unit, when communicating with the server by the second communication unit and acquiring the emergency flag from the server, senses the occurrence of a matter of emergency.

2. The emergency communication system according to claim 1, wherein the recording unit repeatedly records at a predetermined interval after occurrence of a matter of emergency is sensed by the sensing unit.

3. The emergency communication system according to claim 1, wherein the server further includes a guardian notification unit that notifies a guardian of the object person sound information transmitted from the object person terminal.

4. The emergency communication system according to claim 1, wherein
the object person terminal further includes an emergency acceptance unit that accepts an instruction regarding the occurrence of a matter of emergency, and
the sensing unit senses the occurrence of a matter of emergency when the emergency acceptance unit is operated.

5. The emergency communication system according to claim 1, wherein
the object person terminal further includes a sensor for detecting a motion of the object person terminal, and
the sensing unit senses occurrence of a matter of emergency based on an output of the sensor.

6. The emergency communication system according to claim 1, wherein the setting unit, when the location of the object person terminal specified by the specification unit is included in a predetermined range within the watching area, sets the emergency flag for the object person terminal.

7. The emergency communication system according to claim 1, wherein the setting unit, when the location of the object person terminal specified by the specification unit is outside the watching area, sets the emergency flag for the object person terminal.

8. The emergency communication system according to claim 1, wherein the setting unit, when the identification information transmitted from the first communication unit of the object person terminal is not acquired for a predetermined time, sets the emergency flag for the object person terminal.

9. The emergency communication system according to claim 1, wherein
the recording unit further records ambient images when occurrence of a matter of emergency is sensed by the sensing unit, and
the second communication unit, when the occurrence of a matter of emergency is sensed by the sensing unit, transmits information indicating a recorded image recoded by the recording unit to the server.

10. The emergency communication system according to claim 1, wherein
the second time interval is longer than at least the first time interval, the second communication unit transmitting the identification information and the location information to the server.

11. The emergency communication system according to claim 1, wherein
the detection terminal is installed at a predetermined position included in the watching area,
the transmission unit transmits information for identifying the detection terminal, and
the acquisition unit uses the information for identifying the detection terminal transmitted from the detection terminal, to acquire the information on the location of the detection terminal from a storage unit in which the information for identifying the detection terminal and the location of the detection terminal are stored in advance in association with each other.

12. The emergency communication system according to claim 1, wherein
the detection terminal is provided in a mobile body moving in a region including the watching area,
the transmission unit acquires the information on the location of the detection terminal based on a signal from the GPS satellite and transmits the information to the server, and
the acquisition unit acquires the information on the location of the detection terminal based on the information transmitted from the detection terminal.

13. An emergency communication system comprising:
an object person terminal carried by an object person;
a detection terminal that is present in a region including a watching area of the object person set in advance, and detects the object person terminal with which communication is possible via short-range wireless communication;
a server that registers information transmitted from the object person terminal and the detection terminal; and
a sensing unit that senses occurrence of a matter of emergency,
wherein the object person terminal includes:
a first communication unit that transmits identification information for identifying the object person terminal via the short-range wireless communication and outputs, at a pre-set first time interval, a signal for performing the short-range wireless communication,
a second communication unit that acquires, at a pre-set second time interval, location information of the object person terminal based on a signal from a GPS satellite, and transmits the identification information and the location information to the server via long-range wireless communication a communication distance of which is longer than a communication distance of the short-range wireless communication; and
a recording unit that records ambient sounds as object person sound information, wherein the detection terminal includes:
a detection unit that detects the object person terminal with which communication is possible; and
a transmission unit that, when the object person terminal is detected by the detection unit, acquires the identification information transmitted from the first communication unit and transmits the identification information to the server, wherein the server includes:
an acquisition unit that acquires the identification information transmitted from the detection terminal and information on a location of the detection terminal;
a specification unit that specifies a location of the object person terminal based on the identification information and the information on the location of the detection terminal acquired by the acquisition unit, or the identification information and the location information transmitted from the second communication unit of the object person terminal, wherein the second communication unit of the object person terminal transmits, when occurrence of a matter of emergency is sensed by the sensing unit, the object person sound information recorded by the recording unit to the server;
a receiving unit that receives distribution sound information to be distributed to the object person terminal; and
a sound flag setting unit that, when the distribution sound information is received in the receiving unit, sets a sound distribution flag,
wherein the object person terminal further includes:
an object person notifying unit that notifies the object person, when communicating with the server by the second communication unit and acquiring the sound distribution flag from the server, that the distribution sound information has been received;
an acquisition instruction acceptance unit that accepts an instruction for acquiring the distribution sound information; and
a sound output unit that outputs a sound, wherein
the second communication unit, when the instruction is accepted in the acquisition instruction acceptance unit, communicates with the server to acquire the distribution sound information, and
the sound output unit outputs a sound corresponding to the distribution sound information acquired by the second communication unit.

14. An emergency communication system comprising:
an object person terminal carried by an object person;
a detection terminal that is present in a region including a watching area of the object person set in advance, and detects the object person terminal with which communication is possible via short-range wireless communication;
a server that registers information transmitted from the object person terminal and the detection terminal; and
a sensing unit that senses occurrence of a matter of emergency,
wherein the object person terminal includes:
a first communication unit that transmits identification information for identifying the object person terminal via the short-range wireless communication and outputs, at a pre-set first time interval, a signal for performing the short-range wireless communication;

a second communication unit that acquires, at a pre-set second time interval, location information of the object person terminal based on a signal from a GPS satellite, and transmits the identification information and the location information to the server via long-range wireless communication a communication distance of which is longer than a communication distance of the short-range wireless communication; and a recording unit that records ambient sounds as object person sound information, wherein the detection terminal includes:

a detection unit that detects the object person terminal with which communication is possible; and a transmission unit that, when the object person terminal is detected by the detection unit, acquires the identification information transmitted from the first communication unit and transmits the identification information to the server, wherein the server includes:

an acquisition unit that acquires the identification information transmitted from the detection terminal and information on a location of the detection terminal; and a specification unit that specifies a location of the object person terminal based on the identification information and the information on the location of the detection terminal acquired by the acquisition unit, or the identification information and the location information transmitted from the second communication unit of the object person terminal, wherein the second communication unit of the object person terminal transmits, when occurrence of a matter of emergency is sensed by the sensing unit, the object person sound information recorded by the recording unit to the server, the emergency communication system further comprising:

a visualization unit that outputs, in association with the information on the location of the object person terminal specified by the specification unit, display corresponding to the object person sound information recorded at the location, to be visualized.

* * * * *